United States Patent [19]
Sugimoto

[11] 3,991,644
[45] Nov. 16, 1976

[54] METHOD FOR CONTROLLING THE CUTTING FEED SPEED OF A SAW FRAME OF BAND-SAWING MACHINE OR SIMILAR MACHINE

[75] Inventor: Tadahiro Sugimoto, Amagasaki, Japan

[73] Assignee: Daito Seiki Company, Ltd., Japan

[22] Filed: Dec. 3, 1974

[21] Appl. No.: 529,105

[30] Foreign Application Priority Data
Dec. 4, 1973  Japan.............................. 48-13663
Mar. 11, 1974  Japan.............................. 49-28346

[52] U.S. Cl..................................... 83/800; 83/13; 83/370
[51] Int. Cl.².......................................... B23D 55/08
[58] Field of Search .............. 83/13, 371, 372, 370, 83/794, 800, 801, 490

[56] References Cited
UNITED STATES PATENTS
2,602,987  7/1952  Wells ................................... 83/800
2,649,646  8/1953  Remmen .............................. 83/490
3,269,248  8/1966  Nast et al............................. 83/371

*Primary Examiner*—Donald R. Schran
*Attorney, Agent, or Firm*—Wenderoth, Lind & Ponack

[57] ABSTRACT

A method of controlling the cutting feed speed of a saw frame of a band-sawing machine or a similar machine, whereby the change of cutting resistance to the saw blade is detected by sensing the change of load on the back of the saw blade or the change of pressure of an oil pressure cylinder supporting the saw frame and by transforming such change into a voltage change or amperage change by means of a piezo-electric element, the flow rate of a flow control valve provided at the pressure oil discharge circuit of the oil pressure cylinder being controlled by said detected voltage or the like and thereby the cutting feed speed being changed in response to the change of cutting resistance so as to maintain the cutting resistance to the saw frame at an optimum value.

9 Claims, 4 Drawing Figures

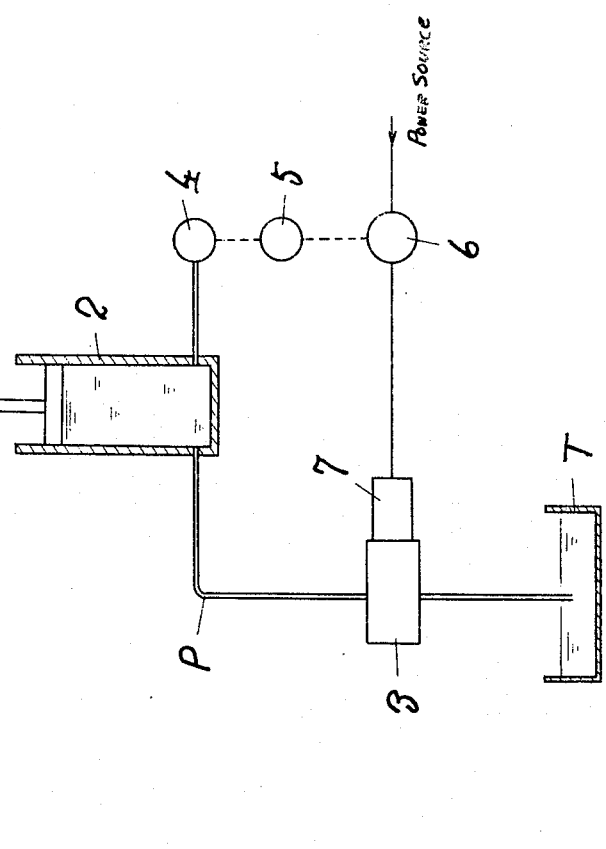
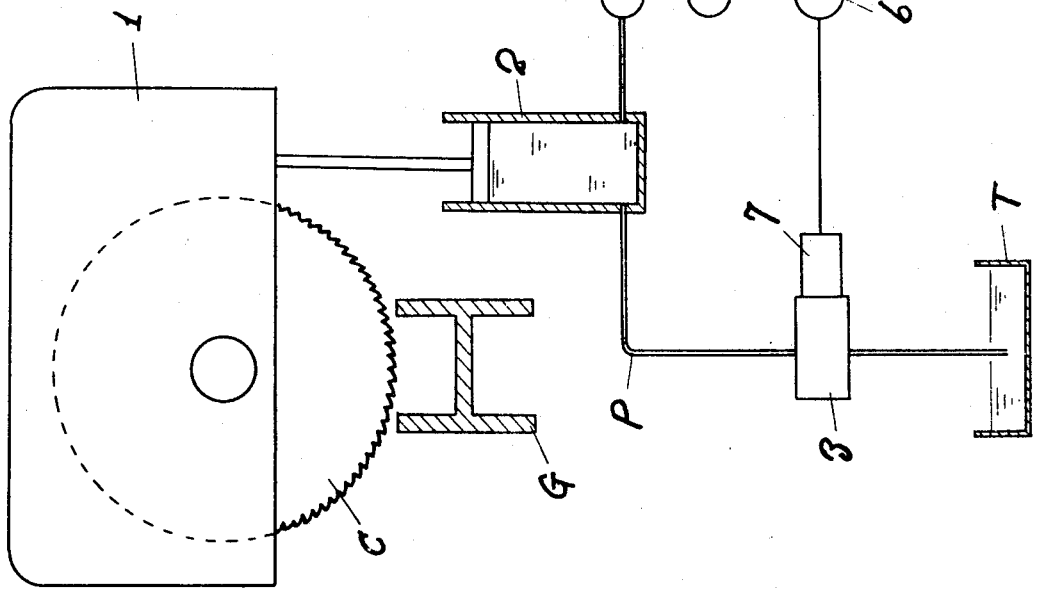
Fig. 3
Fig. 4

METHOD FOR CONTROLLING THE CUTTING FEED SPEED OF A SAW FRAME OF BAND-SAWING MACHINE OR SIMILAR MACHINE

This invention relates to a method for controlling the cutting feed speed of a saw frame. More particularly, this invention provides a method whereby cutting resistance to a saw blade during cutting is detected electrically in order to control the cutting feed speed of a saw frame automatically by means of the detected output of the detecting element, such as the voltage or amperage and thereby maintain the cutting resistance to a saw blade uniform.

In the conventional band sawing machine or similar machine, the cutting feed speed of a saw frame is effected by supporting the weight of a saw frame itself by an oil pressure cylinder and by discharging pressure oil contained in the cylinder little by little. The cutting feed speed of a saw frame is kept almost constant by the set flow rate of a flow control valve, regardless of load applied to the saw blade. Therefore, in the case where material to be cut is H-section steel, for example, there is difference in length of the blade along which cutting is taking place between the central portion which has a large width and the other portions which have a small width and if the fixed cutting feed is applied to such material, excessive load is applied to the saw blade at the portion having a large width, with the result of breakage of sawteeth or the saw blade. In order to prevent such trouble, it is the usual practice to adjust the flow control valve so that the saw frame may descend at such a speed that it does not cause breakage of the saw blade at the portion of the material to be cut having a large width. This, however, involves a disadvantage that the saw frame descends at a slower speed than required at the portion where resistance is smaller and as a result, cutting efficiency is lowered.

In view of the above disadvantage, the present invention has for an object to change the cutting feed speed of the saw frame automatically in response to the change of cutting resistance to the saw blade so as to ensure the optimum cutting.

The nature and advantage of the present invention will be understood more clearly from the following description made with reference to the accompanying drawings, in which:

FIG. 3 is a diagram, similar to FIG. 1, of another embodiment of the present invention, in which the change of oil pressure applied to the cylinder for moving the saw frame vertically is detected in order to control the cutting feed speed of the saw frame; and FIG. 4 is a diagram, similar to FIG. 1, of still another embodiment, in which the present invention is applied to a circular saw.

Figure 1:
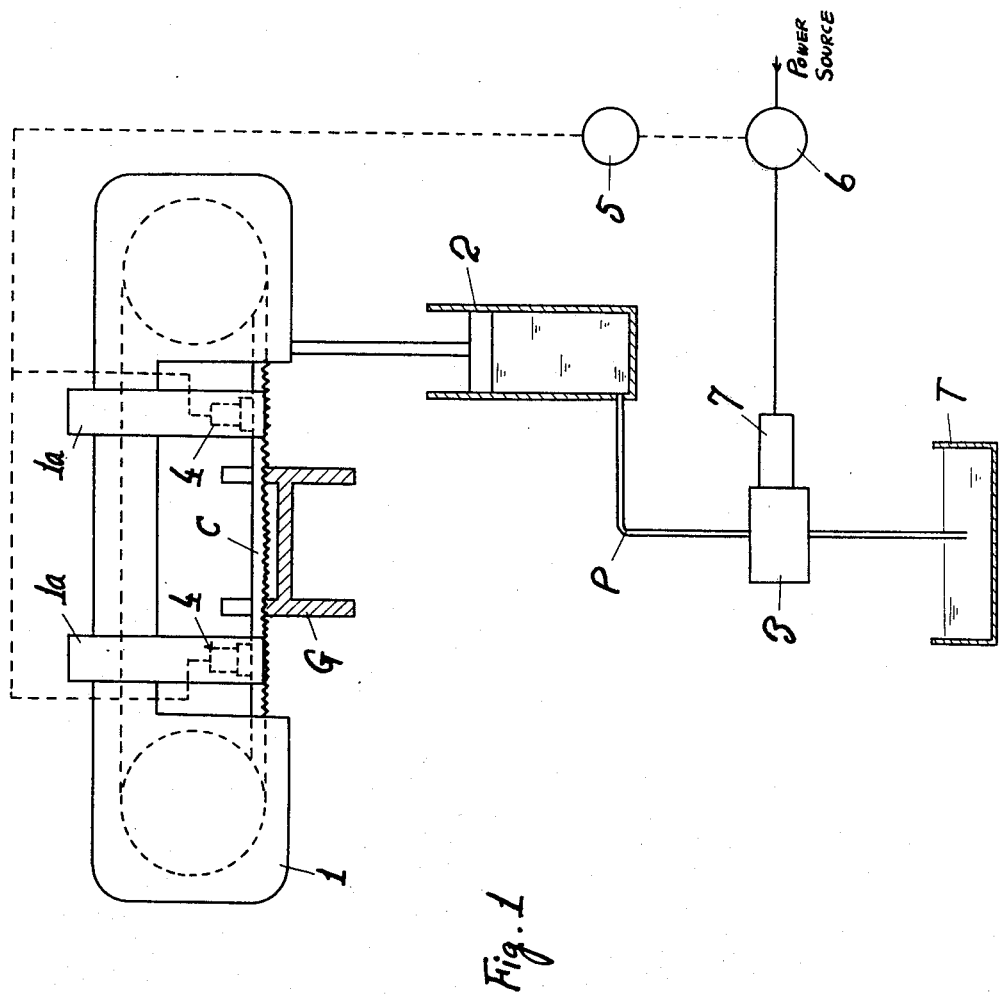
FIG. 1 is a diagram of an embodiment of the present invention which controls the cutting feed speed of a saw frame by detecting the change of load applied to the back of a band saw blade.
Figure 2:
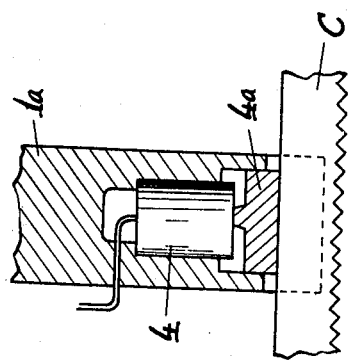
FIG. 2 is a cross sectional view of a piezo-electric element forming part of the embodiment shown in FIG. 1.

In the drawings, numeral 1 denotes a saw frame equipped with a band-saw blade C. Numeral 2 is an oil pressure cylinder by which the saw frame 1 is caused to rise or descend. Numeral 3 is a flow control valve, for example, a plunger type flow control valve, by which pressure oil is discharged from the oil pressure cylinder 2 during a cutting operation. T is a tank for working oil which is discharged from the oil pressure cylinder 2 via an oil discharge pipe P and the flow control valve 3. A speed change motor 7 for regulating the flow rate is connected to the flow control valve 3. The above-mentioned saw frame 1 has two saw guides 1a to keep the saw blade C at a normal position. A shoe 4a is set inside the saw guide 1a and on the back of the band saw blade C. A detecting element 4 for continuously detecting the change of load as a change of electric output, such as voltage or amperage, and which can be a piezo-electric element, for example, is fixed to the saw guide 1a. The piezo-electric element 4 should have a characteristic such that the voltage detected is zero at the upper limit of the load but is a maximum at no-load. This piezo-electric element 4 is generally provided at each of the saw guides 1a but may be provided only at one of the saw guides. An amplifier 5 to amplify the detected voltage is connected to the piezo-electric element. Connected to the amplifier 5 is a motor controlling device 6 which controls the speed change motor 7 by amplified voltage. G in the drawing is material to be cut.

In the case where material G, here shown as H-section steel, is cut by the above-mentioned apparatus, when cutting portions have a small width, cutting resistance is small because the cutting length along the blade is short. Therefore, the load applied to the back of the saw blade is small and consequently a small load is applied to the piezo-electric element, through the medium of the shoe 4a fitted in the saw guide. As the piezo-electric element generates a high detected voltage corresponding to the small load, such detected voltage is amplified by the amplifier and the amplified voltage, namely, a speed increase signal is transmitted to the motor controlling device 6, whereupon the speed change motor increases its speed, with the result that the flow control valve 3, a metering valve, etc. increase their r.p.m., which increases the quantity of pressure oil to be discharged from the oil pressure cylinder. In other words, the cutting feed speed of the saw blade C increases and cutting is effected, with the optimum load on the saw blade C.

When cutting the central portion of H-section steel, it is only natural that cutting resistance becomes larger because of a longer cutting length and in consequence, a big load is applied to the back of the saw blade and to the piezo-electric element 4 through the shoe 4a. As this piezo-electric element 4 generates a low detected voltage in response to a big load, such a low detected voltage is amplified by the amplifier 5 and a speed decrease signal is transmitted to the motor controlling device 6, whereupon the speed of the speed change motor 7 decreases, the r.p.m. of the plunger type flow control valve connected to the speed change motor 7 decreases, the quantity of pressure oil to be discharged from the oil pressure cylinder decreases, and the cutting feed speed of the saw frame 1 is reduced, with the result that cutting is effected with the optimum load on the saw blade C. Thus, the change of resistance to the saw blade is detected as a change of load on the back of the saw blade and is fed back to the cutting feed speed control so as to make uniform the resistance applied to the saw blade and effect optimum cutting.

Shown by FIG. 3 is another embodiment of the present invention, in which the change of cutting resistance is detected as a change of oil pressure of the oil pressure cylinder for moving the saw frame, instead of as a change of load on the back of the band saw. In the embodiment of FIG. 3, a piezo-electric element which has characteristic such that the voltage detected is a maximum at the upper limit of the oil pressure but is zero at the lower limit of the oil pressure, is provided in such a position that it is subjected to a change of the pressure of the oil pressure cylinder 2 which controls the descending of the saw frame. Similarly to the embodiment in FIG. 1, the amplifier 5 and the speed change motor control device, etc. are connected to the piezo-electric element. In the embodiment of FIG. 3, in the case where H-section steel or material to be cut is cut, resistance of the saw blade becomes small when cutting the upper portion and the lower portion of G. At this time, the load of the saw frame 1 (weight of the saw frame itself) is applied almost entirely to the oil pressure cylinder 2, with the result that oil pressure inside the cylinder rises and applies a big pressure to the piezo-electric element 4. Since the piezo-electric element 4 in this embodiment generates a high detected voltage in response to a big pressure, such voltage is amplified by the amplifier 5 and the big amplified voltage, i.e., a speed increase signal is transmitted to the motor controlling device 6, whereupon the speed change motor 7 increases its speed, the r.p.m. of the plunger type flow control valve 3 increases, the quantity of pressure oil discharged from the oil pressure cylinder increases, the cutting feed speed of the saw frame 1 becomes faster and thus the cutting operation is carried out with the optimum load on the saw blade C.

In the case where the cutting length is longer, such as the central portion of H-section steel, and resistance to the saw blade is higher, more of the load of the saw frame 1 is applied to the saw blade and the load applied to the oil pressure cylinder reduced and a smaller pressure is applied to the piezo-electric element 4. As the piezo-electric element 4 in to a embodiment generates a small detected voltage in response to small pressure, such detected voltage is amplified by the amplifier and the small amplified voltage, i.e., a speed decrease signal, is transmitted to the motor controlling device 6, whereupon the speed of the speed change motor 7 decreases, the r.p.m. of the plunger type flow control valve 3 connected to the speed change motor decreases, the quantity of pressure oil discharged from the oil pressure cylinder 2 decreases, the cutting feed speed of the saw frame 1 decreases and the cutting operation is carried out with the optimum load on the saw blade C. Thus, a change of resistance to the saw blade is detected as a change of pressure of the oil pressure cylinder and is fed back to the cutting feed speed so as to make uniform the resistance applied to the saw blade and effect optimum cutting.

The method for controlling the cutting feed speed of a saw frame according to the present invention can be applied to a circular saw, as shown by FIG. 4. In the embodiments of FIG. 1, FIG. 3 and FIG. 4, the same effect can be obtained by substituting the flow control valve 3, the speed change motor 7 and the motor controlling device 6 with a throttle type flow control valve, an electromagnetic valve shifter (electro-magnet, for example) and a shifter controlling device respectively. Furthermore, in the embodiments of FIGS. 1, 3 and 4, the detecting signal from the piezo-electric element 4 can be based on electric amperage or the like, instead of voltage.

According to the present invention, the system is so designed that the flow control valve which causes the saw frame to descend in proportion to the degree of resistance to the saw blade is controlled. Therefore, it is possible to cut material of any shape at the optimum cutting speed without any unreasonable strain on the saw blade. In other words, the present invention has the advantages that it prevents blade breakage and enhances cutting efficiency.

What is claimed is:

1. In combination with a sawing machine having blade means with a continuous sawing edge, a vertically movable saw frame on which said blade means is rotatably mounted, and an oil cylinder coupled to said saw frame for making said saw frame rise and descend, an apparatus for controlling the descending speed of the saw frame, comprising a detecting element engaged with one of the parts of said sawing machine for continuously detecting a change of the cutting resistance to said blade means and producing an electrical output, an amplifier connected to said detecting element for amplifying the output, a motor controlling device connected to said amplifier, a speed change motor driven by said motor controlling device and a flow control valve connected to said speed change motor for controlling the flow of oil, an exhaust conduit in which said flow control valve is connected and being in turn connected with said oil pressure cylinder for automatically regulating the quantity of oil under pressure exhausted from said oil cylinder in response to the change of cutting resistance of the saw blade for automatically changing the speed of descent of the saw frame in response to the change of cutting resistance to effect cutting while keeping the cutting resistance uniform.

2. The combination as claimed in claim 1 in which said detecting element is a load-voltage responsive element.

3. The combination as claimed in claim 1 in which said detecting element is a piezoelectric element.

4. The combination as claimed in claim 1 in which said blade means is a band type blade, and said detecting element bears on the back of side blade.

5. The combination as claimed in claim 4 in which said detecting element is a piezoelectric element.

6. The combination as claimed in claim 1 in which said detecting element is a pressure responsive element and is associated with said oil pressure cylinder for being exposed to the pressure of the oil therein.

7. The combination as claimed in claim 6 in which said detecting element is a piezoelectric element.

8. The combination as claimed in claim 6 in which said blade means is a band type blade.

9. The combination as claimed in claim 6 in which said blade means is a circular saw blade.

* * * * *